United States Patent
Lundkvist et al.

(10) Patent No.: US 12,520,813 B2
(45) Date of Patent: Jan. 13, 2026

(54) SYSTEM AND METHOD FOR MONITORING CLEANING PROCESS IN MILKING INSTALLATION

(71) Applicant: DELAVAL HOLDING AB, Tumba (SE)

(72) Inventors: Erik Lundkvist, Tumba (SE); Christian Schmitz, Tumba (SE)

(73) Assignee: DeLaval Holding AB, Tumba (SE)

( * ) Notice: Subject to any disclaimer, the term of this patent is extended or adjusted under 35 U.S.C. 154(b) by 0 days.

(21) Appl. No.: 18/876,473

(22) PCT Filed: Jun. 12, 2023

(86) PCT No.: PCT/SE2023/050585
§ 371 (c)(1),
(2) Date: Dec. 18, 2024

(87) PCT Pub. No.: WO2023/249533
PCT Pub. Date: Dec. 28, 2023

(65) Prior Publication Data
US 2025/0380660 A1    Dec. 18, 2025

(30) Foreign Application Priority Data
Jun. 20, 2022   (SE) .................................... 2250754-5

(51) Int. Cl.
*A01J 7/02*    (2006.01)
*A01J 5/01*    (2006.01)
(Continued)

(52) U.S. Cl.
CPC ................. *A01J 5/01* (2013.01); *A01J 5/047* (2013.01); *A01J 7/022* (2013.01); *A01K 1/12* (2013.01)

(58) Field of Classification Search
CPC ..... A01J 5/01; A01J 5/047; A01J 7/022; A01J 7/02
See application file for complete search history.

(56) References Cited

U.S. PATENT DOCUMENTS 8,191,507 B2 *   6/2012   Persson ................... A01J 7/022
                                                119/14.08
10,694,713 B2 *   6/2020   De Hullu ................ A01J 7/022
(Continued)

FOREIGN PATENT DOCUMENTS

EP          3868200 A1    8/2021
JP       2012005421 A     1/2012
(Continued)

OTHER PUBLICATIONS

International Search Report for PCT/SE2023/050585 mailed Sep. 26, 2023, 4 pages.
(Continued)

*Primary Examiner* — Monica L Perry
(74) *Attorney, Agent, or Firm* — NIXON & VANDERHYE

(57) ABSTRACT

The disclosure concerns a system (1) for monitoring a cleaning process in a milking installation (2). A central controller (3) obtains from a pressure sensor arrangement (36) at each milking point (10) of the installation (2) an identity indicator indicative, a series of measured values of pressure levels indicative of pressure levels, and temporal indicators. The central controller (3) is configured: —for each pressure sensor arrangement (36) to store in a database (5), —to evaluate the series of measured values of pressure levels to determine a progress of a slug of cleaning liquid along a common milk line (4), and—to issue a notification signal related to the progress of the slug of cleaning liquid along the common milk line (4).

20 Claims, 5 Drawing Sheets

(51) Int. Cl.
*A01J 5/04* (2006.01)
*A01K 1/12* (2006.01)

(56) References Cited

U.S. PATENT DOCUMENTS

| | | | | |
|---|---|---|---|---|
| 2003/0226510 | A1* | 12/2003 | van den Berg | A01J 5/01 119/14.02 |
| 2011/0041770 | A1 | 2/2011 | Westman | |
| 2011/0168097 | A1* | 7/2011 | Kristensen | A01J 5/007 119/14.08 |
| 2014/0352728 | A1 | 12/2014 | Svensson | |
| 2018/0290185 | A1 | 10/2018 | Sliva | |
| 2018/0352779 | A1 | 12/2018 | Enickl | |
| 2023/0142734 | A1* | 5/2023 | Paulrud | A01J 5/007 119/14.08 |
| 2025/0000047 | A1* | 1/2025 | Brostedt | A01J 5/007 |
| 2025/0057103 | A1* | 2/2025 | Eijkelkamp | A01J 5/007 |

FOREIGN PATENT DOCUMENTS

| | | |
|---|---|---|
| JP | 2012005963 A | 1/2012 |
| WO | 9939569 A1 | 8/1999 |
| WO | 2017091126 A1 | 6/2017 |
| WO | 2021230798 A1 | 11/2021 |
| WO | 2021262069 A2 | 12/2021 |

OTHER PUBLICATIONS

Written Opinion of the ISA for PCT/SE2023/050585 mailed Sep. 26, 2023, 8 pages.
Search Report for SE2250754-5, mailed Feb. 7, 2023, 3 pages.
"Efficacy Assessment of CIP Processes in Milking Machines", https://www.researchgate.net/publication/238094100Efficacy_Assessment_of_CIP_Processes_in_Milking_Machines (submission pending).
Reinemann et al., "Two-Phase Cleaning Flow Dynamics in Air Injected Milklines", published in the 1994 Transactions of the ASAE, vol. 37(5): 1531-1536, 16 pages.

* cited by examiner

SYSTEM AND METHOD FOR MONITORING CLEANING PROCESS IN MILKING INSTALLATION

This application is the U.S. national phase of International Application No. PCT/SE2023/050585 filed Jun. 12, 2023, which designated the U.S. and claims priority to SE Patent Application No. 2250754-5 filed Jun. 20, 2022, the entire contents of each of which are hereby incorporated by reference.

TECHNICAL FIELD

The invention relates to a system for monitoring a cleaning process in a milking installation and to a method of monitoring a cleaning process in a milking installation. The invention further relates to a computer program for performing a method of monitoring a cleaning process in a milking installation and to a computer-readable storage medium for performing a method of monitoring a cleaning process in a milking installation.

BACKGROUND

For sanitary and health reasons it is important that equipment used when milking animals is cleaned regularly and that this cleaning achieves a certain standard of cleanliness. From an economical point-of-view it is important that adequate cleaning can be performed efficiently to ensure operational availability of the milking installation.

Thus, a so-called clean in place, CIP, procedure is performed for the internal sanitation of a milking installation. The CIP procedure may be either automatic or semi-automatic and is implemented without dismantling the milking installation. Some preparation and reconnecting of liquid paths in the milking installation may be required before the CIP procedure is started.

Commonly, a CIP procedure is performed after a milking session of a herd or group of animals in the milking installation has ended. Alternatively, an extensive milking session in the milking installation may be interrupted or ended in order to perform a CIP procedure.

A CIP procedure may include the following cycles:
An initial rinse cycle to remove milk residue from the conduits of the milking installation. During this cycle lukewarm water may be conducted through the milking installation prior to running hot water through the installation thus, avoiding that milk protein sticks onto inner surfaces of the conduits.
A cleaning cycle to circulate hot water mixed with a cleaning agent in the milking installation, such as an acidic or base agent for removing residues inside the milking installation.
A sanitizing cycle may optionally be included to circulate hot water mixed with disinfectant for killing bacteria.
A final rinse to conduct cold water through the installation for rinsing cleaning agent and/or disinfectant from the milking installation.

The CIP procedure may be monitored in order to verify that a proper cleaning of the milking installation is achieved. The prior art includes solutions for testing and evaluating the cleaning of milking installations.

EP 3868200 discloses a monitoring milk meter, which is able to monitor the livestock being milked, as well as general procedures performed in the milking farm, such as the CIP procedure. The milk meter comprises a temperature sensor and optionally a conductivity and/or a turbidity sensor. Thus, at least the temperature of the cleaning liquids used during CIP of a milking installation may be monitored in each milk meter, and accordingly at each milking point of the milking installation.

WO 2017/091126 discloses a system and a method for evaluating a cleaning process in respect of a milk transporting conduit structure. The cleaning of a milk transporting conduit structure involves introducing fluid and an amount of gas into the milk transporting conduit structure. Thus, a temporary pressure increase is produced, which causes a slug of fluid to be formed in and forwarded through the milk transporting conduit structure. A sensor arrangement temporarily connected to the milk transporting conduit structure measures at least one parameter related to the slug and repeatedly forwards updates of the at least one measured parameter to a data processor. Based thereon, the data processor produces an indicator of at least one quality of the cleaning process. The indicator reflects a cross-sectional profile of the slug in at least one position in the milk transporting conduit structure.

JP 2012-005421 discloses a monitoring device of a pipeline milker. The monitoring device of the pipeline milker includes a milk transportation line connected to a receiver jar for temporarily accumulating milk. Monitoring sensors are arranged in a monitoring pipe section. Further, there is disclosed the use of two vacuum pressure sensors connected at a distance from each other to the milk transportation line for the purpose of determining a flow rate of a cleaning liquid flowing through the milk transportation line.

Pressure sensors may be utilised for monitoring pressure levels during milking in a milking installation. WO 2021/262069 discloses a system and a method for monitoring operating pressure in a milking installation. At least one operating pressure in a milking installation is monitored by a pressure sensor measuring values of a pressure level in a component of the milking installation. The pressure level is indicative of the at least one operating pressure to be monitored. A processing node generates monitoring data representing a series of measured values of the pressure level. The monitoring data contains temporal indicators designating a respective timestamp indicative of a point in time when a value of the pressure level was measured. The temporal indicators serve as a basis for triggering at least one alarm, for example if a timestamp indicates that the pressure level was measured to a value outside of an acceptable range of values at the point in time indicated by the timestamp.

SUMMARY

It would be advantageous to achieve an alternative manner of monitoring the cleaning process in a milking installation. In particular, it would be desirable to enable monitoring of a milking installation to supervise liquid used during cleaning as it passes through at least a portion of a milking installation. To better address one or more of these concerns, one or more of a system, a method, a computer program, and/or a computer-readable storage medium having the features defined in the independent claims is provided.

According to an aspect, there is provided a system for monitoring a cleaning process in a milking installation. The system comprises a central controller and a database. The milking installation comprises: a common milk line, a vacuum source, a receiver connected to the vacuum source, an air injector connected to the common milk line, a number, n, of milking points configured for milking animal individuals and each milking point of the number, n, of milking points being connected to the common milk line at a connecting position, a cleaning system configured to utilise a cleaning liquid and being connected to the number, n, of milking points and to the common milk line. Each milking point of the number, n, of milking points comprises a pressure sensor arrangement configured to measure values of pressure levels, which pressure levels are indicative of pressure levels at least within a portion of the milking point and at the connecting position of the milking point. The central controller obtains from the pressure sensor arrangement at each milking point an identity indicator indicative of the respective pressure sensor arrangement, a series of measured values of pressure levels, and temporal indicators designating points in time when each measured value of the series of measured values of pressure levels was measured. The central controller is configured:

- for each pressure sensor arrangement to store in the database the identity indicator, the series of measured values of pressure levels, and the temporal indicator of each measured value of the series of measured values of pressure levels,
- to evaluate the series of measured values of pressure levels from at least a first pressure sensor arrangement of a first milking point of the number, n, of milking points and a second pressure sensor arrangement of a second milking point of the number, n, of milking points in order to determine a progress of a slug of cleaning liquid along the common milk line at the respective connecting positions of the first and second milking points, and
- to issue a notification signal related to the progress of the slug of cleaning liquid along the common milk line.

Since the central controller of the system obtains from the pressure sensor arrangement at each milking point the series of measured values of pressure levels, since the central controller is configured to store and evaluate these series of measured values of pressure levels from at least a first and a second pressure sensor arrangement in order to determine a progress of a slug of cleaning liquid along the common milk line, and since the central controller is configured to issue a notification signal related to the progress of the slug of cleaning liquid along the common milk line—an operator of the milking installation is provided with information about the slugs of cleaning liquid traveling through the common milk line.

According to a further aspect there is provided, a method of monitoring a cleaning process in a milking installation. The milking installation comprises: a common milk line, a vacuum source, a receiver connected to the common milk line and connected to the vacuum source, an air injector connected to the common milk line, a number, n, of milking points configured for milking animal individuals and each milking point of the number, n, of milking points being connected to the common milk line at a connecting position, a cleaning system configured to utilise a cleaning liquid and being connected to the number, n, of milking points and to the common milk line. Each milking point of the number, n, of milking points comprises a pressure sensor arrangement configured to measure values of pressure levels, which pressure levels are indicative of pressure levels at least within a portion of the milking point and at the connecting position of the milking point. The method comprises steps of:

- obtaining from the pressure sensor arrangement at each milking point an identity indicator indicative of the respective pressure sensor arrangement, a series of measured values of pressure levels, and temporal indicators designating points in time when each measured value of the series of measured values of pressure levels was measured,
- for each pressure sensor arrangement, storing in a database the identity indicator, the series of measured values of pressure levels, and the temporal indicator of each measured value of the series of measured values of pressure levels,
- evaluating the series of measured values of pressure levels from at least a first pressure sensor arrangement of a first milking point of the number, n, of milking points and a second pressure sensor arrangement of a second milking point of the number, n, of milking points in order to determine a progress of a slug of cleaning liquid along the common milk line at the respective connecting positions of the first and second milking points, and
- issuing a notification signal related to the progress of the slug of cleaning liquid along the common milk line.

Since the method includes obtaining from the pressure sensor arrangement at each milking point the series of measured values of pressure levels, since the method includes storing and evaluating these series of measured values of pressure levels from at least a first and a second pressure sensor arrangement in order to determine a progress of a slug of cleaning liquid along the common milk line, and since the method includes issuing a notification signal related to the progress of the slug of cleaning liquid along the common milk line—an operator of the milking installation is provided with information about the slugs of cleaning liquid traveling through the common milk line.

It has been realised by the inventors that the pressure sensor arrangements forming part of each milking point of a milking installation is useable in order to monitor indirectly pressure changes in a common milk line of the milking installation and that thus, the passage of slugs of cleaning liquid through the common milk line during cleaning of the milking installation can be monitored via the pressure sensor arrangements of the milking points. No dedicated pressure sensors arranged in the common milk line are required for this task.

Also, it has been realised by the inventors, that monitoring of pressure levels in a common milk line of a milking installation at multiple positions during cleaning of a milking installation provides an indication of the progress of a slug of cleaning liquid through the common milk line. Moreover, it has been realised that locations of possible system errors causing a slug of cleaning liquid to disperse may be located by comparing monitored series of pressure levels from pressure sensor arrangements of milking points located at different positions along the common milk line.

The term slug in the context of cleaning of a milking installation relates to a detached mass of cleaning liquid that fills up an entire cross section of a line or conduit and travels along the line or conduit causing a cleaning action on inner surfaces of the line or conduit.

A slug of cleaning liquid can pick up cleaning liquid as it travels along the common milk line and accordingly, increase in length. A slug can lose cleaning liquid as it travels along the common milk line and accordingly, decrease in length. If a slug loses too much cleaning liquid, it is dispersed.

If one or more slugs of cleaning liquid are dispersed in the common milk line, this may result in an inferior cleaning of the common milk line. Monitoring the progress of a slug of cleaning liquid in the common milk line and issuing the notification signal related to the progress of the slug of cleaning liquid along the common milk line, therefore, provides information as to an expected cleaning result achieved by a cleaning operation, at least with respect to the cleaning of the common milk line.

A slug of cleaning liquid in the common milk line may disperse for various reasons, such as faulty pressure levels, air leakage into the common milk line or the milking points, bad connections between parts of the cleaning system such as wrongly placed teatcups of a milking point on a cleaning shelf, wrong amount of cleaning liquid used by the cleaning system, ruptured teatcup liners, ruptured milk conduits, etc.

The present system and method which provides for monitoring during cleaning and the issuing of the notification signal related to the progress of the slug of cleaning liquid along the common milk line can according to some embodiments be utilised for locating a portion of the milking installation where the dispersion of slugs of cleaning liquid occurs.

Herein, the milking installation may alternatively be referred to simply as the installation. In the technical field, a milking installation may alternatively be referred to as a milking plant.

The milking installation may be used for milking the animals of a herd of animals at a farm e.g. twice daily. In such case, the milking installation may be used in two discrete milking sessions with cleaning of the installation in between the milking sessions. On larger farms with hundreds or thousands of milking animals, a milking installation may be utilised for milking over several hours, up to around the clock. On such large farms, a milking session may have to be interrupted in order to clean the milking installation before continuing the milking session.

According to embodiments, in the number, n, of milking points, n≥2 milking points.

According to some embodiments, in the number, n, of milking points, n≥10 milking points, or n≥30 milking points, such as within a range of n=10-50 milking points, or n=10-100 milking points, or n=10-150 milking points.

The milking installation may comprise a milking parlour, such as a herringbone milking parlour, a parallel milking parlour, or a rotary milking parlour. Accordingly, the milking points may be arranged in a stationary herringbone or parallel configuration in the milking parlour or in a herringbone or parallel configuration on a rotary platform. Such parlours are known in the art.

Animals, such as cows, may be milked in the milking installation at the respective milking points of the number, n, of milking points. The milking points are configured for milking of animal individuals. Thus, at each milking point there is provided milking equipment for drawing milk from the teats of an animal.

Such milking equipment is known and comprises a set of teatcups and a milk conduit leading from the teatcups to the common milk line. The milk conduit connects to the common milk line at one of the above-mentioned connecting positions.

The milk conduit may comprise one or more separate portions, such as a claw, a long milk hose, a milk meter, a shut-off valve, etc.

In the context of measuring values of pressure levels, which pressure levels are indicative of pressure levels at least within a portion of the milking point, the term "portion of the milking point" may relate to the milk conduit or a portion of the milk conduit, such as in one or more of the above-mentioned separate portions of the milk conduit.

The common milk line is a milk line leading from the milking points to the receiver. That is, during milking, the milk extracted at each milking point is conducted into the common milk line at the connecting position of each relevant milking point. The milk from the milking points is conducted collectively via the common milk line to the receiver from where it is pumped to a milk tank for collecting and/or storing the extracted milk. During cleaning of the milking installation, slugs of cleaning liquid travel along the common milk line in order to clean the same.

The vacuum source, comprising one or more vacuum pumps, is connected to the receiver for producing a vacuum level or pressure in the receiver, the common milk line, and the milking points. The vacuum source produces a vacuum level/pressure during milking in the milking installation and also, during cleaning of the milking installation.

The vacuum level/pressure is a sub-atmospheric pressure, where 0 kPa represents the atmospheric pressure level. Herein, a pressure level of larger vacuum pressure level is represented by a larger positive value than a pressure level of smaller vacuum pressure level.

During cleaning of the milking installation, the cleaning system provides cleaning liquid such as one or more of lukewarm water, warm water with a detergent, water with a disinfectant, and cold water. The cleaning liquid is conducted to the number, n, of milking points and to the common milk line. The cleaning liquid may be drawn into the milking points and the common milk line by the vacuum pressure produced by the vacuum source. Optionally, the cleaning liquid may be pumped along certain passages to the milking points and/or the common milk line. Namely, a size of the milking installation, and/or a height difference between parts of the cleaning system and the common milk line, may be of such magnitude that vacuum pressure alone cannot provide a reliable supply of cleaning liquid to the milking points and/or the common milk line.

The cleaning system may be configured for cleaning the milking installation by providing the cleaning liquid to the milking points and the common milk line. For instance, the cleaning system may comprise a vat for holding an amount of cleaning liquid which is conducted to the common milk line and the milking points via one or more dedicated cleaning lines. Also, the cleaning system e.g., at the vat may be configured for admitting air into the one or more of the one or more dedicated cleaning lines.

The cleaning liquid may be introduced in the form of slugs through the teatcups of the milking points to clean the same and the milk conduits as the cleaning liquid is conducted from the teatcups to the connecting position of the relevant milking point and into the common milk line. The size and volume of slugs of cleaning liquid introduced into the teatcups may change as the slugs travel through the milk conduit towards the connecting position e.g., due to changes in area of the through flow area along the milk conduit.

Moreover, the cleaning liquid may be separately introduced in the form of one slug at a time into the common milk line at, or close to, the air injector. The thus, introduced slug may increase in volume by picking up cleaning liquid in the common milk line e.g., cleaning liquid coming from the milking points. The slug in the common milk line may decrease in volume as it travels along the common milk line.

Accordingly, the cleaning liquid will be conducted thorough the milking points and their respective milk conduits in the form of slugs. The cleaning liquid will be conducted thorough the common milk line in the form of one separate slugs at a time. Also, in between slugs in the common milk line, cleaning liquid from the milking points may flow along the common milk line towards the receiver.

In between slugs, air is drawn through the milking points to the common milk line by the vacuum pressure provided by the vacuum source connected to the receiver. The air may be provided to the milking points via the cleaning system and/or via air inlets in the teatcups or claws at the milking points. In the common milk line, in between slugs, air is drawn through the common milk line by the vacuum pressure provided by the vacuum source connected to the receiver. The air is drawn or injected via the air injector into the common milk line.

The cleaning liquid may be supplied intermittently from the vat directly to the common milk line, to the milking points, and to the common milk line via the milking points. For instance, cleaning liquid may be conducted to the milking points and the common milk line until the vat is empty. Until the volume of cleaning liquid from the vat has circulated through the common milk line and the milking points via the receiver back to the vat, no cleaning liquid may be supplied to the common milk line and the milking points.

From the receiver, the cleaning liquid is pumped back to the vat of the cleaning system or to drain.

Cleaning of the milking installation with cleaning liquid as discussed herein may form part of a CIP procedure for cleaning the milking system.

Cleaning of the milking installation is performed after a milking session of a herd or group of animals in the milking installation has ended. Alternatively, an extensive milking session in the milking installation may be interrupted or ended in order to perform cleaning of the milking installation.

The pressure sensor arrangement is connected to the milk conduit. The pressure sensor arrangement is arranged in fluid communication with the common milk line at the connecting position via the milk conduit of the relevant milking point. Thus, the pressure sensor arrangement is able to sense and measure pressure changes in the common milk line at the connecting position.

The pressure sensor arrangement is configured to measure values of pressure levels in the relevant milking point and values of pressure levels representative of pressure levels at the connecting position of the milking point. Accordingly, the pressure sensor arrangement comprises at least a pressure sensor and a control unit. The control unit is configured at least to sample values provided by the pressure sensor, to convert the sampled values to values of pressure levels, i.e., to measured values of pressure levels, and to assign temporal indicators to the measured values of pressure levels. The pressure sensor arrangement further may comprise one or more of a memory unit, a communication interface, a timer or clock circuitry. The communication interface may be configured to wirelessly communicate with the central controller e.g., via a gateway at the milking installation or via a wired connection.

Accordingly, the pressure sensor arrangement may be configured for one or more of: storing the identity indicator indicative of the pressure sensor arrangement, storing one or more measured values of pressure levels, storing the temporal indicators designating the points in time when each measured value was measured, transmitting the identity indicator, transmitting the measured values of pressure levels, transmitting the temporal indicators to the central controller, and receiving communication signals e.g. from the central controller or a gateway.

The pressure sensor arrangement, specifically a pressure sensor or the pressure sensor arrangement, may be arranged in a liquid-containing portion of the milking point, such a liquid-containing space of the milk conduit, such as a long milk hose, a claw, a teatcup, a shut-off valve or any other suitable component forming a portion of the milk conduit.

Alternatively, the pressure sensor arrangement, specifically a pressure sensor or the pressure sensor arrangement, may be arranged in a dry portion of the milking point, such as a dry space of a component connected to, or forming a portion of, the milk conduit. For instance, the pressure sensor may be arranged at a shut-off valve part of which forms a portion of the milk conduit. In such embodiments, the dry space may be delimited in part by a diaphragm of the shut-off valve. Via the diaphragm, the pressure sensor may indirectly sense a pressure in the milk conduit.

The system for monitoring a cleaning process in a milking installation may be located at a farm where also the milking installation is located. In such embodiments, the central controller and the database may form part of a computer and/or a server at the farm. Alternatively, or additionally, the system may be located remote from the farm where the milking installation is located. In such embodiments, the monitoring of a cleaning process in a milking installation may be provided by a service provider. The system may form part of a cloud-based computing and storing solution.

According to embodiments, the central controller being configured to evaluate the series of measured values of pressure levels from at least the first pressure sensor arrangement and the second pressure sensor arrangement may comprise the central controller being configured:

to compare a first series of measured values of pressure levels from the first pressure sensor arrangement with a second series of measured values of pressure levels from the second pressure sensor arrangement. In this manner, for instance properties of a slug at the first and second connecting positions may be reflected by the series of measured values of pressure levels from the first and second pressure sensor arrangements and conclusions may be drawn e.g., such as to the speed of the slug and/or as to changes in properties of the slug between the respective connecting positions, such as increase or decrease in length and its possible dispersion. The issued notification signal may reflect such properties and/or drawn conclusions.

According to embodiments, the central controller being configured to compare the first series of measured values of pressure levels from the first pressure sensor arrangement with the second series of measured values of pressure levels from the second pressure sensor arrangement may comprise the central controller being configured:

to assess whether the first series of measured values of pressure levels from the first pressure sensor arrangement and the second series of measured values of pressure levels from the second pressure sensor arrangement fulfil a comparison criterion. In this manner, a change in properties of a slug as it travels along the common milk line between the connecting positions of the first and second milking points may be assessed with respect to at least one predetermined criterion. The comparison criterion may e.g., form a threshold for determining whether a slug has changed within permissible limits or not, such as whether a decrease in length of the slug suggests a fault in the milking installation. The issued notification signal may indicate whether the first series of measured values of pressure levels and the second series of measured values of pressure levels fulfil the comparison criterion.

According to embodiments, the central controller being configured to evaluate the series of measured values of pressure levels from at least the first pressure sensor arrangement and the second pressure sensor arrangement may comprise the central controller being configured:

to compare a first series of measured values of pressure levels from the first pressure sensor arrangement and/or a second series of measured values of pressure levels from the second pressure sensor arrangement with one or more stored series of values of pressure levels. In this manner, for instance properties of a slug at the first and second connecting positions may be compared with stored series of values of pressure levels representing a reference series of values of pressure levels.

Thus, conclusions may be drawn in respect of properties of a current series of measured values of pressure levels from the first and/or second pressure sensor arrangement. Such as whether the current slug has a sufficient length to ensure proper cleaning of the common milk line or has dispersed at one of the number, n, of the milking points. The issued notification signal may reflect such properties and/or drawn conclusions.

According to embodiments, the central controller being configured to compare the first series of measured values of pressure levels from the first pressure sensor arrangement and/or the second series of measured values of pressure levels from the second pressure sensor arrangement with one or more stored series of values of pressure levels may comprise, the central controller being configured:

to assess whether the first series of measured values of pressure levels from the first pressure sensor arrangement and/or the second series of measured values of pressure levels from the second pressure sensor arrangement fulfils a comparison criterion when compared to the one or more stored series of values of pressure levels. In this manner, the properties of a slug in the common milk line may be assessed with respect to at least one predetermined criterion. The comparison criterion may e.g., form a threshold for determining whether a slug has properties within permissible limits or not, such as whether a length of the slug is sufficient to ensure proper cleaning of the common milk line or whether the slug has dispersed. The issued notification signal may reflect whether the first series of measured values of pressure levels and/or the second series of measured values of pressure levels fulfils the comparison criterion when compared to the one or more stored series of values of pressure levels.

According to embodiments, the one or more stored series of values of pressure levels may be one or more previously obtained series of measured values of pressure levels measured by the first pressure sensor arrangement and/or the second pressure sensor arrangement. In this manner, the one or more previously obtained series of measured values of pressure levels, which for instance have been obtained under verifiable ideal cleaning conditions to provide reliable series of measured values of pressure levels e.g., representing a slug that fulfils certain length criteria, may be used for comparison of current series of measured values of pressure levels from the first and/or second pressure sensor arrangement.

According to embodiments, the one or more stored series of values of pressure levels may be one or more generalised series of values of pressure levels. In this manner, the one or more generalised series of values of pressure levels, which for instance represent a slug that fulfils certain length criteria, may be used for comparison of current series of measured values of pressure levels from the first and/or second pressure sensor arrangement.

According to a further aspect there is provided a computer program for performing a method of monitoring a cleaning process in a milking installation, wherein the computer program comprises computer readable code configured to cause a central processing unit to perform a method according to any one of aspects and/or embodiments discussed herein.

According to a further aspect there is provided, a computer-readable storage medium for performing a method of monitoring a cleaning process in a milking installation, wherein the computer-readable storage medium comprises computer readable code configured to cause a central processing unit to perform a method according to any one of aspects and/or embodiments discussed herein.

Further features of, and advantages with, the invention will become apparent when studying the appended claims and the following detailed description.

BRIEF DESCRIPTION OF THE DRAWINGS

Various aspects and/or embodiments of the invention, including its particular features and advantages, will be readily understood from the example embodiments discussed in the following detailed description and the accompanying drawings, in which.

DETAILED DESCRIPTION

Aspects and/or embodiments of the invention will now be described more fully. Like numbers refer to like elements throughout. Well-known functions or constructions will not necessarily be described in detail for brevity and/or clarity.

Figure 1:
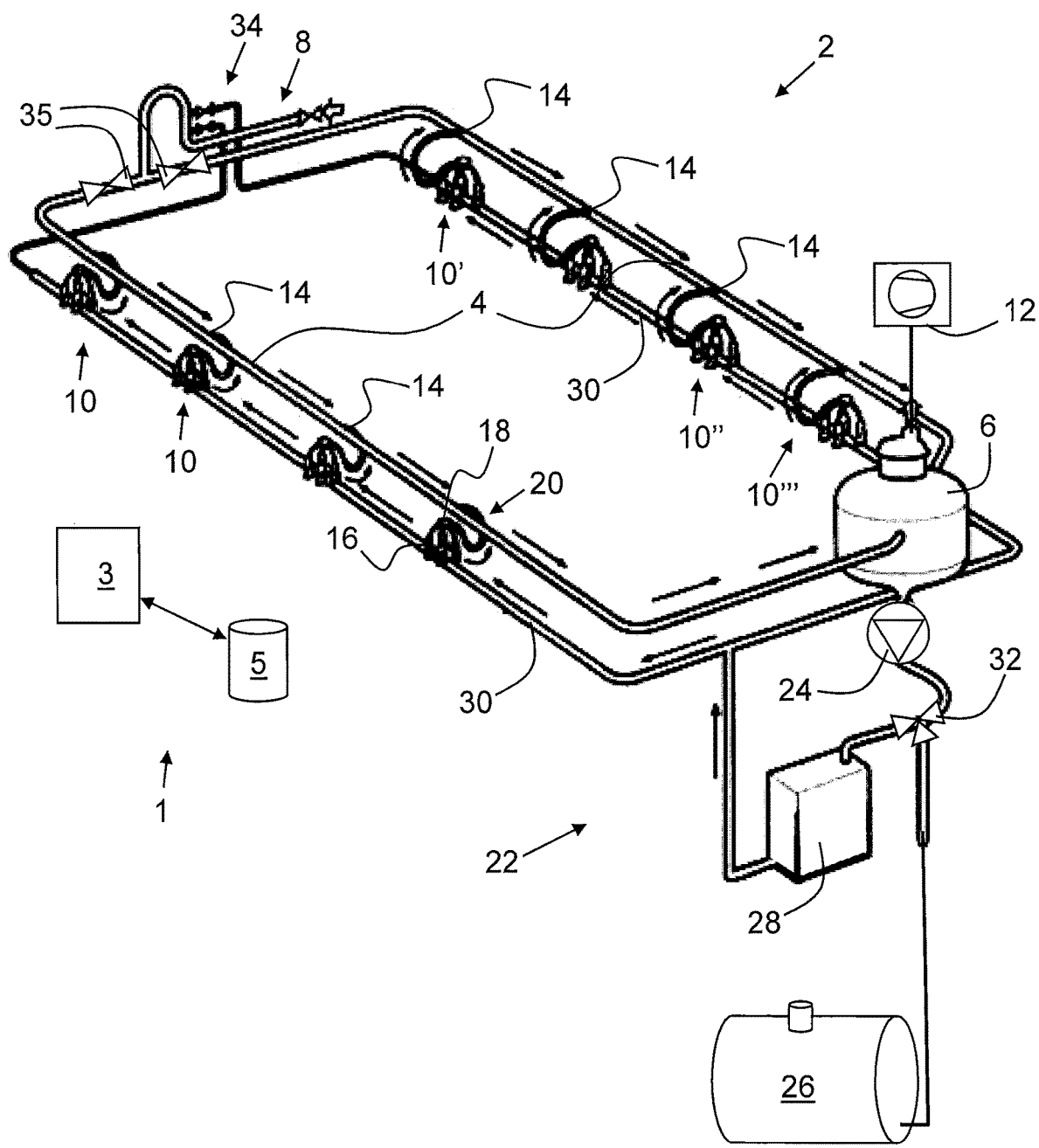
FIGS. 1-3 schematically illustrates embodiments of a system for monitoring a cleaning process in a milking installation.

FIG. 1 schematically illustrates embodiments of a system 1 for monitoring a cleaning process in a milking installation. FIG. 1 also illustrates an example of a milking installation 2.

The system 1 comprises a central controller 3 and a database 5.

The milking installation 2 comprises a common milk line 4, a receiver 6 connected to the common milk line 4, an air injector 8 connected to the common milk line 4, and a number, n, of milking points 10 connected to the common milk line 4.

The common milk line 4 extends in a loop, the ends of which are connected via the receiver 6. Along the loop, between two of the milking points 10 farthest away from the receiver 6, the air injector 8 is arranged. From the milking points 10 farthest away from the receiver 6, each of the two branches of the loop formed by the common milk line 4 is arranged with a slight inclination towards the receiver 6. Thus, liquids in the common milk line 4 will flow towards the receiver 6.

In the illustrated embodiments, n=8 milking points 10 are shown. However, depending on the size of the milking installation 2 and the number of animals to be milked in the installation 2, it may comprise many more milking points, such as n>30 milking points, n>50 milking points, even up to n=200 milking points.

The installation 2 further comprises a vacuum source 12. The vacuum source 12 is connected to the receiver 6 and configured to produce a vacuum pressure in the receiver 6, the common milk line 4, and the number, n, of milking points 10. Thus, the vacuum source 12 comprises at least one vacuum pump. The vacuum pressure produced by the vacuum source 12 is utilised during milking of animals in the installation 2 and during cleaning of the milking installation 2.

Each milking point 10 of the number, n, of milking points 10 is configured for milking animal individuals. Each milking point 10 is connected to the common milk line 4 at a connecting position 14. Each milking point 10 comprises at least one teatcup 16 and is arranged to milk one animal at a time. The animals stand in a milking parlour (not shown) of the milking installation 2 during milking.

In the illustrated embodiments, each milking point 10 comprises four teatcups 16 connected to a claw 18 and a milk conduit 20. The claw 18 may be seen to form a portion of the milk conduit 20. Since the milking point 10 comprises four teatcups 16 it may be configured to milk cows.

The milk conduit 20 connects the teatcups 16 to the common milk line 4 at the connecting position 14 of the relevant milking point 10. The milk conduit 20 may comprise one or more separate portions, such as the claw 18, a long milk hose, a milk meter, a shut-off valve, etc. See also further below with reference to FIG. 2.

As mentioned above, the vacuum source 12 produces a vacuum level/pressure in the receiver 6. Since the common milk line 4 connects to the receiver 6 and since the milking points 10 connect to the common milk line 4 at the respective connecting positions 14, the vacuum level/pressure in the receiver 6 propagates to the common milk line 4 and to each of the milking points 10.

A vacuum pressure level in the receiver 6 may be for instance, within a range of 35-55 kPa below atmospheric pressure.

In a known manner, a shut-off valve forming a portion of the milk conduit 20 is arranged to close the connection between the teatcups and the common milk line 4 and thus, to shut off the vacuum pressure connection from the common milk line to the teatcups 16. During cleaning of the milking installation 2, the shut-off valve is open and thus, the vacuum pressure connection from the common milk line to the teatcups 16 is open.

Milk extracted at each milking point 10 is conducted into the common milk line 4 at the connecting position 14 of the milking point 10. Gravity causes the milk to flow from the milking points 10 to the receiver 6, as indicated in FIG. 1 by arrows next to the common milk line 4. A pump 24 connected to the receiver 6 pumps the milk from the receiver 6 via conduits to a milk tank 26 for collecting the milk. The milk tank 26 may be a stationary storage tank or a tank arranged on a trailer to be transported to a dairy once filled.

As such the milking of animals in the milking installation 2 may be performed in any known manner.

The milking installation 2 further comprises a cleaning system 22 for cleaning at least part of the milking installation 2. The cleaning system 22 is connected to the number, n, of milking points 10 and to the common milk line 4. The cleaning system 22 is configured to utilise a cleaning liquid for cleaning at least part of the installation 2.

The cleaning system 22 comprises a cleaning unit 28 and one or more cleaning lines 30.

In a known manner, the cleaning unit 28 is configured for mixing and holding the various cleaning liquids used during cleaning of the installation 2. Also, the cleaning unit 28 is configured for heating one or more of the cleaning liquids. The cleaning unit 28 comprises a vat for holding a batch of cleaning liquid during mixing and/or heating thereof. Different batches of cleaning liquids may be prepared one at a time, as their uses are required during a cleaning process of the installation 2. At the cleaning unit 28 air may be introduced into the one or more cleaning lines 30 in order to create slugs of cleaning liquid in the one or more cleaning lines 30.

One or more of the one or more cleaning lines 30 lead from the cleaning unit 28 to each of the milking points 10 and/or to the common milk line 4.

At each milking point 10, the relevant cleaning line 30 is provided with a cleaning shelf for supplying cleaning liquid from the cleaning line 30 to the teatcups 16 during cleaning of the installation 2. During cleaning of the installation 2, the teatcups 16 of the milking points 10 are connected to the cleaning shelves.

The relevant cleaning line/s 30 connect/s to the common milk line 4 close to the air injector 8. A liquid collection arrangement 34 for collecting a volume of cleaning liquid may be provided at the air injector 8. The liquid collection arrangement 34 may comprise a tube which is at least partially filled with cleaning liquid.

At least one valve may be arranged for admitting cleaning liquid to the liquid collection arrangement 34. When such a valve is open, the vacuum pressure in the common milk line 4 may draw the cleaning liquid from the cleaning line 30 into the liquid collection arrangement 34. The air injector 8 may be connected to the liquid collection arrangement 34 and may comprise a valve for admitting ambient air into the liquid collection arrangement 34. Hereby, a slug of cleaning liquid is created in the common milk line 4 which will be transported along the common milk line 4 to the receiver 6. In the illustrated embodiments, one or more valves may be configured for directing the slug along either one of the two branches of the loop formed by the common milk line 4.

After milking in the installation 2 has ended and all the milk in the receiver 6 has been pumped to the milk tank 26, one or more valves 32 are set to direct a flow path from the receiver 6 and the pump 24 to the cleaning unit 28. Thus, the installation 2 is prepared for cleaning thereof. As an alternative to the use of the one or more valves 32, a conduit downstream of the pump 24 may be manually repositioned to establish a flow path from the pump 24 to the cleaning unit 28.

Also, during cleaning of the installation 2, a vacuum pressure is provided in the receiver 6, the common milk line 4, and the milking points 10.

During cleaning of the installation 2 cleaning liquid may be circulated in the installation 2. The cleaning liquid is drawn by vacuum pressure, or pumped by a non-shown pump, from the cleaning unit 28 to the cleaning line 30. From the cleaning line 30, the cleaning liquid is drawn through the milking points 10 and to the common milk line 4 via the connecting positions 14. Also, from the cleaning line 30, cleaning liquid is drawn into the liquid collection arrangement 34. In FIG. 1, the cleaning liquid flowing through the cleaning line 30 is indicated with arrows next to the cleaning line 30.

Intermittently, the valve of the air injector 8 is opened and air is injected via the air injector 8 to inject the cleaning liquid in the liquid collection arrangement 34 one slug at a time into the common milk line 4. During cleaning of the common milk line 4, the cleaning liquid travels in one slug at a time through the common milk line 4 from the air injector 8 to the receiver 6. Some cleaning liquid in the common milk line 4 may also be transported by gravity to the receiver 6 e.g., when the common milk line 4 is drained of remaining cleaning liquid. In FIG. 1, the cleaning liquid flowing through the common milk line 4 is indicated with arrows next to the common milk line 4.

From the receiver 6, cleaning liquid is pumped by the pump 24 back to the cleaning unit 28.

The slug of cleaning liquid cleans the common milk line 4 as it travels along the same to the receiver 6.

In sequence, during a complete cleaning cycle of the installation 2 the cleaning liquid may be e.g., lukewarm water, warm water with a detergent, water with a disinfectant, and cold water.

As such the cleaning of the milking installation 2 may be performed in any known manner which utilises slugs of cleaning liquid traveling along the common milk line 4.

Each milking point 10 of the number, n, of milking points 10 comprises a pressure sensor arrangement configured to measure values of pressure levels, see FIGS. 2, 4*a*, and 4*b* below. The measured values of pressure levels are indicative of pressure levels at least within a portion of the relevant milking point 10 and at the connecting position 14 of the relevant milking point 10.

Also, the receiver 6 may comprise a pressure sensor arrangement for sensing a parameter related to a pressure in the receiver 6. Thus, the pressure in the receiver 6 may be established e.g., for comparison purposes with the measured values of pressure levels from the pressure sensor arrangements of the milking points 10.

During cleaning of the installation 2, the pressure sensor arrangements of the number, n, of milking points 10 are configured to transfer data to the central controller 3. Such data may include one or more of an identity indicator indicative of the respective pressure sensor arrangement, a series of measured values of pressure levels, and temporal indicators designating points in time when each measured value of the series of measured values of pressure levels was measured.

In a known manner, each milking point 10 may comprise a milking point controller (not shown) configured inter alia for controlling and/or supervising milking at the relevant milking point 10 and/or for providing visual and/or audible information to an operator attending to milking of animals in the milking installation 2.

Alternatively, or additionally, in a known manner, the milking installation 2 may comprise a milking installation controller (not shown) e.g., implemented in a computer or server at a farm to which the installation 2 belongs. The milking installation controller may monitor and supervise operation of the milking installation 2 and operations in the installation 2. The milking installation controller may provide a farmer with information e.g., about milking operations, cleaning operations, animal individuals, etc.

In a known manner, the cleaning system 22 may comprise a cleaning system controller (not shown) configured for controlling and/or supervising a cleaning operation of the milking installation 2 and/or the cleaning system 22 e.g., according to pre-set cleaning programs. The cleaning system controller may for instance control various steps in the preparing and distribution of cleaning liquids, such as filling water into the vat and dosing detergent and disinfectant, respectively, in the water, heating the cleaning liquid to a required temperature, and the conducting of cleaning liquid and air to the one or more cleaning lines 30.

Figure 2:
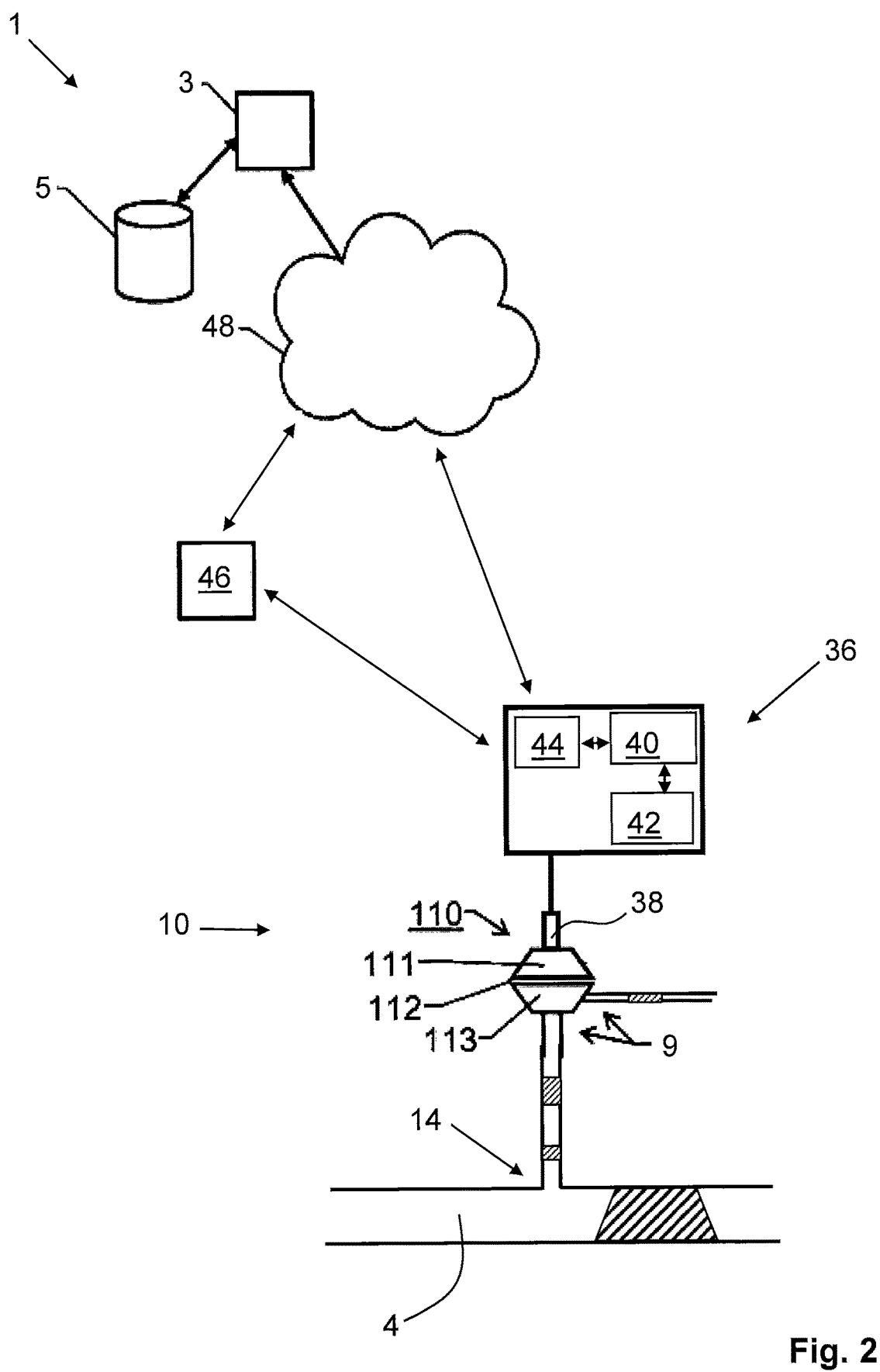

FIG. 2 schematically illustrates embodiments of a system 1 for monitoring a cleaning process in a milking installation. The milking installation may be a milking installation 2 as discussed above with reference to FIG. 1. Accordingly, in the following reference is also made to FIG. 1.

The system 1 for monitoring a cleaning process comprises a central controller 3. The system 1 further comprises a database 5.

FIG. 2 also shows part of a milking point 10 of the number, n, of milking points 10 of the milking installation 2. The milking point 10 comprises a pressure sensor arrangement 36 configured to measure values of pressure levels.

A pressure sensor arrangement 36, as shown in FIG. 2, is comprised in each milking point 10 and is arranged at, or in, a milk conduit 9 of the relevant milking point 10, such that the pressure sensor arrangement 36 is able to measure pressure levels indicative of pressure levels at least within a portion of the milking point 10 and at its connecting position 14 to the common milk line 4.

Accordingly, the measured values of pressure levels and the series of measured values of pressure levels discussed herein are provided by of the pressure sensor arrangements 36 of the respective milking points 10.

The pressure sensor arrangement 36 may be arranged in connection with a portion of the milking point 10. In these embodiments, the pressure sensor arrangement 36 is arranged in connection with a shut-off valve 110 of the milking point 10.

The pressure sensor arrangement 36 is configured to measure values of pressure levels in a portion of the milking point 10 i.e., in this case at the shut-off valve 110. These pressure levels are indicative of pressure levels at least within a portion of the milking point 10 and at its connecting position 14.

In these embodiments, the pressure sensor arrangement 36 is at least partially arranged in a dry space 111 of the shut-off valve 110, which dry space 111 connects to a wet space 113 of the shut-off valve 110, via a diaphragm 112. The wet space 113 forms a portion of the milk conduit 9. The diaphragm 112 is controllable e.g., in order to close off the milk conduit 9 in between milking of animal individuals at the milking point 10 during a milking session in the installation 2.

Also, the diaphragm 112 will move as the pressure in the milk conduit 9 and/or the common milk line 4 at the connecting position 14 changes during a cleaning operation of the installation 2. Such movements of the diaphragm cause pressure changes in the dry space 111, which pressure changes are measured by the pressure sensor arrangement 36, and which pressure changes are indicative of pressure levels within a portion of the milking point and at its connecting position 14.

According to embodiments, such as in the illustrated embodiments, the pressure sensor arrangement 36 may comprise a pressure sensor 38, a control unit 40, a memory unit 42 for storing at least one series of measured values of pressure levels, and a communication interface 44 for communication directly or indirectly with the central controller 3. In this manner, there may be provided a pressure sensor arrangement 36 which may be configured for measuring values of pressure levels and communicate such measured values of pressure levels to the central controller 3.

The control unit 40 may take the form of substantially any suitable type of processor circuit or microcomputer, e.g. a circuit for digital signal processing (digital signal processor, DSP), a Central Processing Unit (CPU), a processing unit, a processing circuit, a processor, an Application Specific Integrated Circuit (ASIC), a microprocessor, or other processing logic that may interpret and execute instructions. The control unit 40 is connected to the memory unit 42, which provides the control unit 40 with, for example, stored programme code and/or stored data which the control unit 40 needs to enable it to do calculations, such as calculation of measured values of pressure levels from data provided by the pressure sensor 38. The control unit 40 may also be adapted to storing partial or final results of calculations in the memory unit 42, such as one or more measured values of pressure levels, such as the at least one series of measured values of pressure levels. The memory unit 42 may comprise a physical device, such as a RAM and/or an EPROM utilised to store data or programs, i.e., sequences of instructions, on a temporary or permanent basis. The control unit 40 is connected to the pressure sensor 38 for receiving pressure related data therefrom.

A look-up table may be stored in the memory unit 42 e.g., for correlating pressure data from the pressure sensor 38 with pressure values to produced measured values of pressure levels. The control unit 40 may be configured to execute one or more sets of control routines to provide desired functions, such as to receive pressure data from the pressure sensor 38 and to communicate with the central controller 3 via the communication interface 44.

Routines may be executed at regular intervals. Alternatively, routines may be executed in response to occurrence of an event, such as an external request.

According to embodiments, the pressure sensor arrangement 36 may be configured to measure the values of the pressure level at a first frequency e.g., 100 Hz, or at least within a range of 10 to 1000 Hz, and transmit representative data reflecting the measured values of pressure levels directly or indirectly to the central controller 3 at a second frequency that may be lower than the first frequency e.g., 1 Hz, or at least within a range of 0.001 to 100 Hz.

Thus, the control unit 40 is configured to sample values provided by the pressure sensor 38 and to calculate measured values of pressure levels from the sampled values. The control unit 40 is configured to assign a temporal indicator to each measured value.

The representative data may comprise one or more of an identity indicator indicative of the relevant pressure sensor arrangement, measured values of the at least one series of measured values of pressure levels, and temporal indicators designating points in time when each measured value of the measured values of pressure levels was measured.

The memory unit 42 may be configured for one or more of: storing the identity indicator indicative of the pressure sensor arrangement 36, storing one or more measured values of pressure levels, storing the temporal indicators designating the points in time when each measured value was measured.

As indicated above, the pressure sensor 38 of the pressure sensor arrangement 36 may be at least partially arranged in the dry space 111 of the shut-off valve 110. Alternatively, the pressure sensor 38 may be arranged at any other portion of the milk conduit 9 such as a fluid transporting portion of the milk conduit 9, as long as the position of the pressure sensor 38 permits sensing pressure levels indicative of pressure levels at least within a portion of the milking point 10 and at its connecting position 14 to the common milk line 4.

For instance, via the communication interface 44, the pressure sensor arrangement 36 may communicate with a computer or server 46 at a farm, to which the milking installation 2 belongs. Thus, the measured values of pressure levels may be utilised on the farm e.g., for monitoring a cleaning procedure of the milking installation 2. The farm computer or server 46 may be configured for issuing a notification signal, such as an alarm, based on the measured values of pressure levels.

The farm computer or server 46 may form a default gateway or a router for communicating with the central controller 3 of the system 1. Thus, the pressure sensor arrangement 36 may communicate indirectly with the central controller 3 via the farm computer or server 46.

According to embodiments, the communication interface 44 may be configured to wirelessly communicate with the central controller 3 for the central controller 3 to obtain the identity indicator, the series of measured values of pressure levels, and the temporal indicators.

Herein, to wirelessly communicate includes all forms of communication which utilise a transmission path that at least along part of the transmission path between the pressure sensor arrangement 36 and the central controller 3 communicates wirelessly.

For instance, the communication interface 44 of the pressure sensor arrangement 36 may communicate wirelessly via a Bluetooth connection with the farm computer or server 46.

Alternatively, the communication interface 44 may communicate wirelessly via a Bluetooth connection with a gateway connected to a transmission network 48.

A further alternative may be for the communication interface 44 to communicate via an electrical wire or optical fibre connection with a gateway which wirelessly communicates with a transmission network 48. For instance, such a gateway may communicate with more than one, such as all, pressure sensor arrangements 36 of the milking installation 2.

The transmission network 48 may include further communication nodes and wireless, electrical wire, and/or optical fibre connections. The system 1, including the central controller 3 and the database 5, is connected to the transmission network 48.

The central controller 3 and the database 5 may form part of a cloud-based solution.

The farm computer or server 46 may be connected via the transmission network 48 with the central controller 3.

The temporal indicators may be utilised by the central controller 3 for establishing series of measured values of pressure levels from the pressure sensor arrangement 36 of each milking point 10. Such a series of measured values of pressure levels may relate e.g. to one or more pressure pulses or to part of a pressure pulse, caused by one or more slugs of cleaning liquid passing the milking point 10 or a connecting position 14 in the common milk line 4. Such series of measured values of pressure levels may be analysed with respect to certain criteria e.g., by one or more comparisons as discussed herein.

Herein, the term pressure pulse relates to a deviation in pressure level for a limited period of time, such as a reduced vacuum pressure level for a limited period of time deviating from a prevailing higher vacuum pressure level.

Moreover, the temporal indicators of the different pressure sensor arrangements 36 are synchronized e.g., with regard to a master clock of the system 1. Thus, series of measured values of pressure levels related to slugs of cleaning liquid passing through e.g. the common milk line 4 may be identified as pressure pulses propagating through at least parts of the milking installation 2 and any changes in the slug may be monitored. Physical properties of the milking installation 2 available to the central controller 3, such as distances between individual connecting positions 14, may be utilised for assessing the propagation of the pressure pulses represented by the series of measured values of pressure levels.

According to embodiments, the central controller 3 may be arranged at a service provider remote from the milking installation 2. In this manner, a service provider may analyse the measured values of pressure levels.

The analysis may serve one or more of many different purposes. To only mention a few:
- Issue a notification signal related to a progress of a slug of cleaning liquid along the common milk line 4.
- Provided information as to a cleaning result of the milking installation 2.
- Provided information as to a cleaning of the milking installation 2 related certain criteria and/or parameters.
- Monitor the milking installation 2 during cleaning e.g., with respect to leakages.
- Improve one or more parts of a cleaning system 22.
- Improve one or more cleaning cycles of a cleaning procedure performed in the milking installation 2.

As discussed above, during a cleaning procedure of the milking installation 2, a vacuum pressure is applied to the milking points 10 via the common milk line 4 that is connected to the receiver 6. The vacuum pressure prevailing in the receiver 6 draws cleaning liquid through the milking points 10 and to the common milk line 4 via the connecting positions 14. Also, from the air injector 8 slugs of cleaning liquid are drawn through the common milk line 4.

The cleaning liquid travels one slug at a time through the common milk line 4 from the air injector 8 and passes the connecting positions 14 on its way to the receiver 6, in the illustrated embodiments, via one of the branches of the common milk line 4 and controlled by the at least one valve 35. Also, the cleaning liquid travels in slugs through the milking points 10, inter alia through the milk conduit 9 of each milking point 10. In FIG. 2, one slug in the common milk line 4 and three slugs in the milk conduit 9 are indicated with hashed boxes.

The slugs of cleaning liquid clean the common milk line 4 and the milk conduit 9. Each slug extends over the entire cross section of the common milk line 4 and the milk conduit 9, respectively, and has a length along and extension of the common milk line 4 and the milk conduit 9, respectively.

In order to achieve a proper cleaning result, it is important that the slugs of cleaning liquid extend over the entire cross section. An adequate length of a slug in the common milk line 4 may be 15-20 cm.

An extension over the cross section and also a length of the slugs may be monitored utilising the pressure sensor arrangement 36 of each milking point 10, both in the relevant milking point 10 and in the common milk line 4. This so, since the measured values of pressure levels from the pressure sensor arrangement 36 are indicative of pressure levels at least within a portion of the relevant milking point 10 and at the connecting position 14 of the relevant milking point 10.

As will be discussed below, inter alia with reference to FIGS. 4*a* and 4*b*, the slugs through the milk conduit 9 of a milking point 10 and the slugs through the common milk line 4 have different characteristics and accordingly will lead to different pressure level changes. Accordingly, from the measured values of pressure levels from the pressure sensor arrangement 36 at each milking point 10 it may be assessed whether a sequence of measured values of pressure levels, such as one or more series of measured values of pressure levels, relate to a slug in the milk conduit 9 of the milking point 10 or whether a sequence of measured values of pressure levels relate to a slug in the common milk line 4 at a connecting position 14 of the milking point 10. Also, from the measured values of pressure levels from the pressure sensor arrangement 36 at each milking point 10 a length of a slug may be assessed. Moreover, by comparing sequences of measured values of pressure levels related to a specific slug from two different pressure sensor arrangements 36 at respective milking points 10, a change in characteristics of the specific slug may be assessed. Similarly, if a slug disperses, this may be assessed from sequences of the measured values of pressure levels of the pressure sensor arrangements 36 at respective milking points 10.

According to alternative embodiments, the central controller 3 of the system 1 may form part of the computer or server 46 at the farm. The herein discussed functionally thus, may be provided directly at the farm instead of from a remote service provider.

Figure 3:
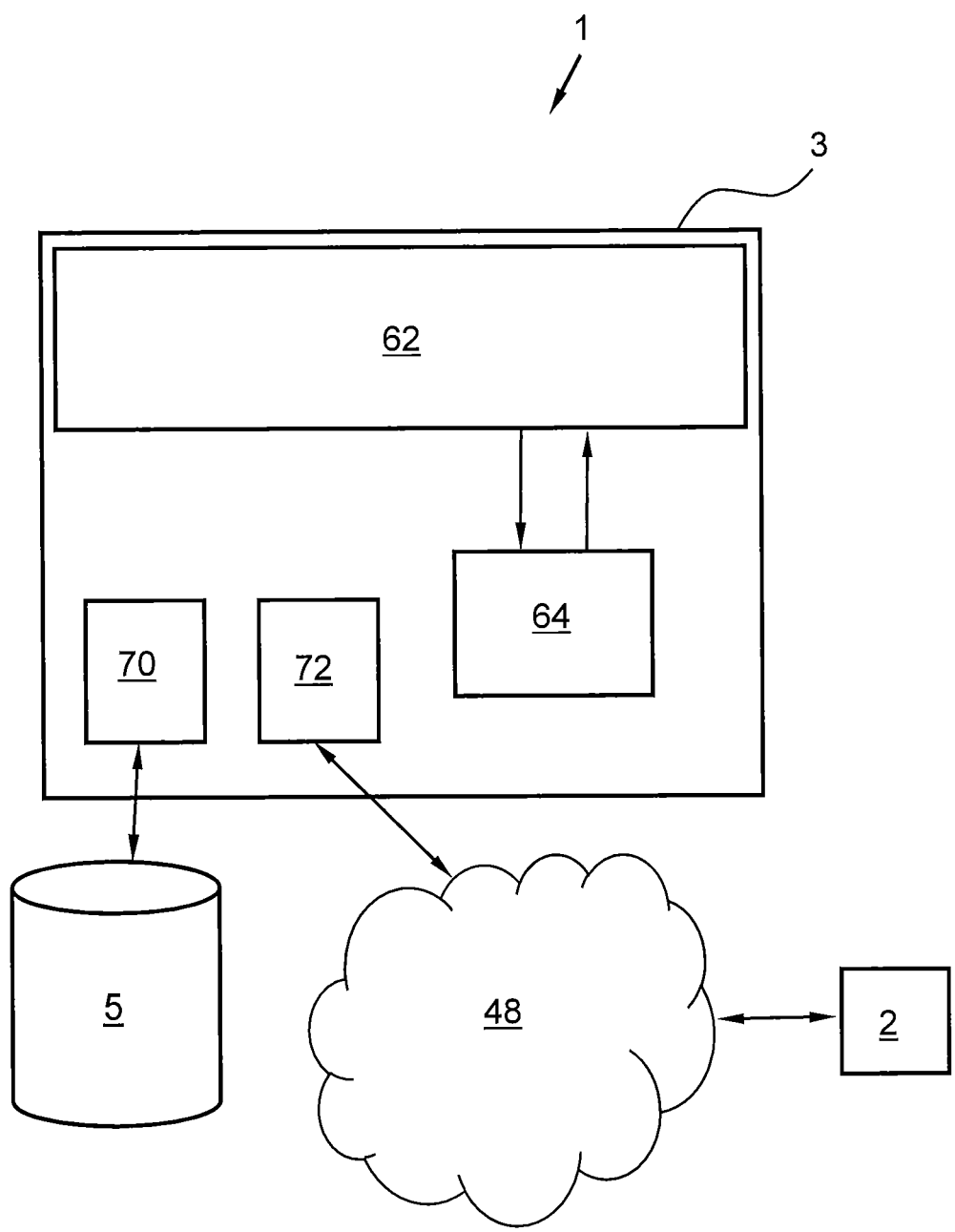

FIG. 3 schematically illustrates embodiments of a system 1 for monitoring a cleaning process in a milking installation. The milking installation may be a milking installation 2 as discussed above with reference to FIG. 1. The system 1 is also indicated in FIGS. 1 and 2. Accordingly, in the following reference is also made to FIGS. 1 and 2.

The system 1 for monitoring a cleaning process comprises a central controller 3. The system 1 further comprises a database 5.

The central controller 3 comprises at least one calculation unit 62, which may take the form of substantially any suitable type of processor circuit or microcomputer, e.g. a circuit for digital signal processing (digital signal processor, DSP), a Central Processing Unit (CPU), a processing unit, a processing circuit, a processor, an Application Specific Integrated Circuit (ASIC), a microprocessor, or other processing logic that may interpret and execute instructions. The herein utilised expression "calculation unit" may represent a processing circuitry comprising a plurality of processing circuits, such as, e.g., any, some or all of the ones mentioned above.

The central controller 3 comprises at least one memory unit 64. The calculation unit 62 is connected to the memory unit 64, which provides the calculation unit 62 with, e.g. stored programme code, data tables, and/or other stored data which the calculation unit 62 needs to enable it to do calculations. The calculation unit 62 is also adapted to store partial or final results of calculations in the memory unit 64. The memory unit 64 may comprise a physical device utilised to store data or programs, i.e. sequences of instructions on a temporary or permanent basis. According to some embodiments, the memory unit 64 may comprise integrated circuits comprising silicon-based transistors. The memory unit 64 may comprise e.g. a memory card, a flash memory, a USB memory, a hard disc, or another similar volatile or non-volatile storage unit for storing data such as e.g. ROM (Read-Only Memory), PROM (Programmable Read-Only Memory), EPROM (Erasable PROM), EEPROM (Electrically Erasable PROM), etc. in different embodiments.

The central controller 3 is further provided with communication interfaces 70, 72 for communication with the database 5 and a transmission network 48. Each of the communication interfaces 70, 72 may receive and send input and output signals via one or more of a cable, a fibre, a data bus, or a wireless connection. In the embodiment depicted, only one calculation unit 62 and memory 64 are shown, but the central controller 3 may alternatively comprise more than one calculation unit and/or memory.

Whereas the memory unit 64 is adapted for use in calculations performed by the calculation unit 62, the database 5 may be utilised primarily for storing data related to the measured values of pressure levels from the milking installation 2.

The central controller 3 communicates via the transmission network 48 with the milking installation 2, such as with the pressure sensor arrangements 36 of the milking points 10.

The central controller 3 may communicate with the computer or server 46 of the farm where the milking installation 2 is located.

The central controller 3 obtains from the pressure sensor arrangement 36 at each milking point 10 an identity indicator indicative of the respective pressure sensor arrangement 36, a series of measured values of pressure levels, and temporal indicators designating points in time when each measured value of the series of measured values of pressure levels was measured. See below with reference to FIGS. 4a and 4b for examples of sequences comprising one or more series of measured values of pressure levels.

Further, the central controller 3 is configured:
for each pressure sensor arrangement 36 to store in the database 5 the identity indicator, the series of measured values of pressure levels, and the temporal indicator of each measured value of the series of measured values of pressure levels,
to evaluate the series of measured values of pressure levels from at least a first pressure sensor arrangement 36 of a first milking point 10' of the number, n, of milking points 10 and a second pressure sensor arrangement 36 of a second milking point 10" of the number, n, of milking points 10 in order to determine a progress of a slug of cleaning liquid along the common milk line 4 at the respective connecting positions 14 of the first and second milking points 10', 10", and
to issue a notification signal related to the progress of the slug of cleaning liquid along the common milk line 4.

The issued notification signal related to the progress of the slug of cleaning liquid along the common milk line 4 may be transmitted e.g. to the computer or server 46 at the farm. A notification signal may indicate that at least cleaning of the common milk line 4 has been performed in accordance with hygienic requirements. The notification signal may relate to a successful progress of one or more slugs along the common milk line 4 and accordingly, to an at least in part successful cleaning of the common milk line 4. Alternatively, a notification signal may indicate that cleaning of the common milk line 4 has not been performed in accordance with hygienic requirements. The notification signal may relate to a failed progress of one or more slugs along the common milk line 4 and accordingly, to an at least in part failed cleaning of the common milk line 4.

In the latter cases the notification signal may comprise an alarm signal or may lead to an alarm signal being initiated at the farm to notify e.g., an operator of the milking installation 2.

According to embodiments, the central controller 3 may comprise stored physical data related to the milking installation 2. The physical data may comprise one or more of distances between adjacent connecting positions 14 along the common milk line 4, a maximum vacuum pressure level in the receiver 6, and patterns of pressure level changes during cleaning of the milking installation 2. In this manner, a "digital twin" of the milking installation 2 may be provided at the central controller 3. The physical data may be utilised for evaluating the series of measured values of pressure levels.

For instance, a distance along the common milk line 4 between adjacent connecting positions 14 to the common milk line 4 of adjacent milking points 10 may be utilised for calculating a speed of a slug of cleaning liquid along the common milk line 4. A maximum vacuum pressure level in the receiver 6 may be utilised for comparing the measured values of pressure levels of the pressure sensor arrangements 36 of the milking points 10 against. Patterns of pressure level changes during cleaning of the milking installation 2 may be utilised for identifying by the central controller 3 that cleaning takes place in the milking installation 2.

Moreover, patterns of pressure levels changes may include one or more example pressure pulses occurring during cleaning of the milking installation 2 for evaluation of the series of measured values of pressure levels form the pressure sensor arrangements 36 of the milking points 10. Thus, adequate and/or inferior slugs of cleaning liquid in the milking installation 2 may be identified by comparing with one or more patterns of pressure level changes.

The central controller 3 is configured to perform a method 200 according to any one of aspects and/or embodiments discussed herein, see e.g. below with reference to FIG. 5.

Figure 4A:
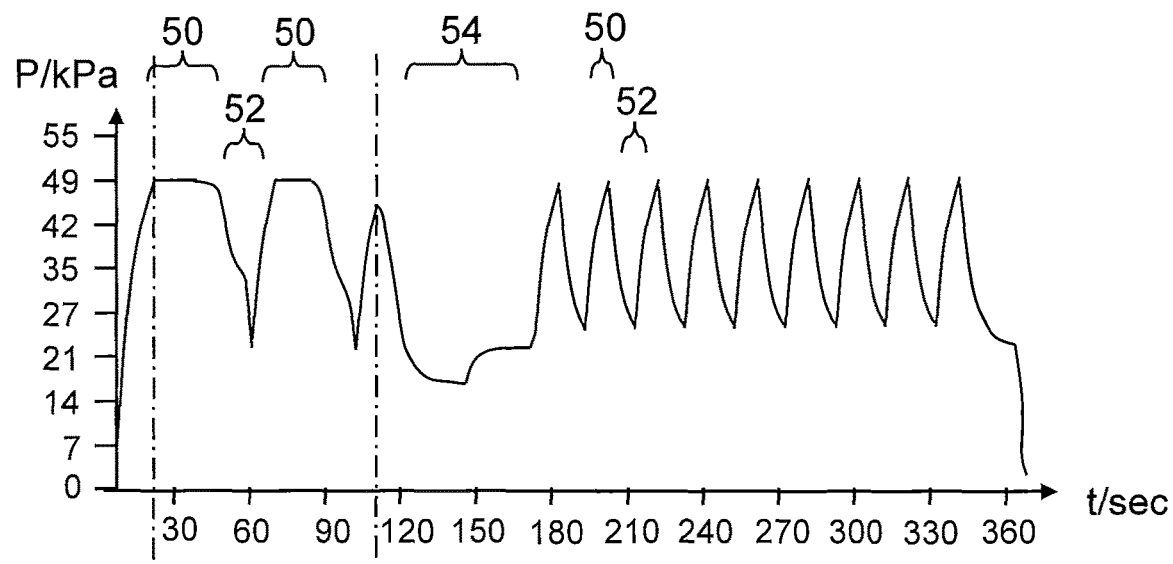
FIGS. 4*a* and 4*b* illustrate diagrams showing graphs representing pressure levels during part of a cleaning procedure of a milking installation.
Figure 4B:
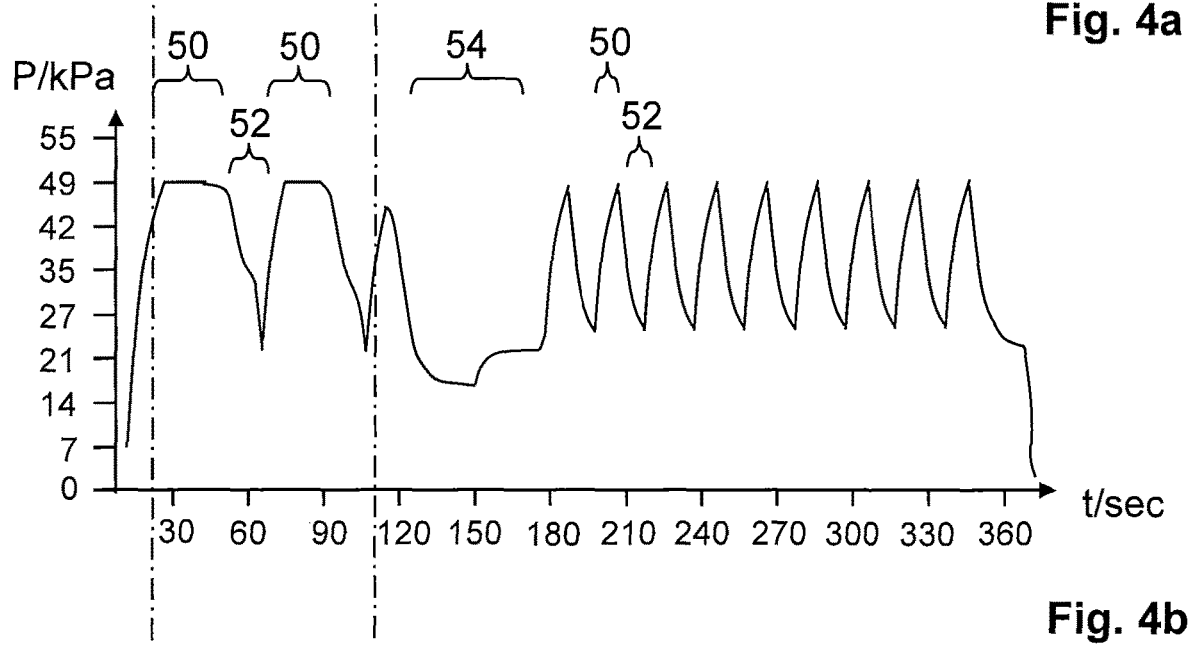

FIGS. 4a and 4b illustrate diagrams showing graphs representing how pressure levels, P, may vary over time, t, during part of a cleaning procedure of a milking installation, such as the milking installation 2 shown in FIG. 1. The diagrams show how pressure levels, P, may vary over time, t, in two milking points 10 of the milking installation 2. The pressure levels may be measured by two pressure sensor arrangements 36 of the kind discussed above with reference to FIGS. 1-3 Measured values of pressure levels are communicated to a central controller 3 of a system 1, as discussed above with reference to FIGS. 1-3. Accordingly, in the following reference is also made to FIGS. 1-3.

It should be noted that a measured pressure level P represents a vacuum pressure, i.e. a sub-atmospheric pressure, where 0 kPa represents the atmospheric pressure level and a pressure level of larger vacuum pressure level is represented by a larger positive value than a pressure level of smaller vacuum pressure level. In other words, the pressure axis, P, represents negative pressure deviations from the atmospheric pressure level.

As discussed above, the measured values of pressure levels are indicative of pressure levels at least within a portion of the relevant milking point 10 and at the connecting position 14 to the common milk line 4 of the relevant milking point 10.

The graph of FIG. 4a represents measured values of pressure levels, which pressure levels are indicative of pressure levels at least within a portion of a first milking point 10' of the number, n, of milking points 10 and at the connecting position 14 to the common milk line 4 of the first milking point 10'. Similarly, the graph of FIG. 4b represents measured values of pressure levels, which pressure levels are indicative of pressure levels at least within a portion of a second milking point 10" of the number, n, of milking points 10 and at the connecting position 14 to the common milk line 4 of the second milking point 10". The starting point in time, t=0 seconds, is the same in both diagrams.

Since the first and second milking points 10', 10" are arranged one after the other along the common milk line 4, the same sequence of measured values of pressure levels pass the relevant connecting positions 14 one after the other at the first and second milking points 10', 10". Due to the distances between the two milking points 10', 10", the sequence of measured values of pressure levels reaches each milking point 10', 10" with a time difference. Two dash-dotted lines extend over the two diagrams of FIGS. 4a and 4b as a reference for visualising the time difference between the passing of the sequence of measured values of pressure levels at each milking point 10', 10".

The sequence of measured values of pressure levels includes successions of measured values of pressure levels 50 with increased vacuum pressure levels and pressure pulses 52, 54 with reduced vacuum pressure levels between the successions of measured values of pressure levels 50 with increased vacuum pressure levels. The pressure pulses 52, 54 with reduced vacuum pressure levels indicate slugs passing through the milking installation 2. The pressure pulses 52 with reduced vacuum pressure levels of short duration may relate to slugs passing through the milk conduit 9 of milking points 10', 10" to the connecting positions 14. The pressure pulses 54 with reduced vacuum pressure levels of longer duration approximately between t=120-t=180 seconds of the graphs may relate to a slug passing along the common milk line 4 towards the receiver 6.

The differently shaped successions of measured values of pressure levels 50 with increased vacuum pressure levels before and after the pressure pulse 54 related to the slug in the common milk line 4 may relate to different steps of a cleaning sequence, such as a pre-rinsing step with cold water and a cleaning step with warm cleaning liquid, respectively.

The sequence of measured values of pressure levels at the first and second milking points 10', 10", FIGS. 4a and 4b, are substantially similar with only a time difference between the two graphs. At a third milking point 10''', the sequence of measured values of pressure levels might differ considerably from the other two sequence of measured values of pressure levels. This may be e.g., due to air leaking into the third milking point 10'''.

For instance, from the difference it may be concluded that the pressure pulse 54 related to the slug in the common milk line 4 has dispersed at the third milking point 10'''.

The central controller 3 obtains from the pressure sensor arrangements 36 at each of the three milking points 10', 10", 10''' an identity indicator indicative of the respective pressure sensor arrangement 36, the sequence of measured values of pressure levels in the form of one or more series of measured values of pressure levels, and temporal indicators designating points in time when each measured value of the series of measured values of pressure levels was measured.

The central controller 3 thus obtains data from which the central controller 3 assesses that at connecting positions 14 of the first and second milking points 10', 10" slugs pass along the common milk line 4 and that cleaning is performed such that hygienic specifications are fulfilled. Moreover, the central controller 3 may assesses based on the obtained data that at the connecting position 14 of the third milking point 10''' cleaning is performed at a standard below hygienic specifications. The central controller 3 may be configured to issue a notification signal related thereto.

Further, the central controller 3 may assess a cause of the change of the sequence of measured values of pressure levels at the third milking point 10''', such as for instance air leaking into the third milking point 10'''.

Herein, a series of measured values of pressure levels may be a sequence of measured values of pressure levels representing a number of successions of measured values of pressure levels 50 and of pressure pulses 52, 54 e.g., as shown in FIGS. 4a and 4b. Further a series of measured values of pressure levels may be a number of measured values of pressure levels approximately correlating with a duration of a succession of measured values of pressure levels 50 or a pressure pulse 52, 54. Further a series of measured values of pressure levels may be a predetermined number of measured values of pressure levels not necessarily correlating with a duration of one or more successions of measured values of pressure levels 50 or pressure pulses 52, 54. A series of measured values of pressure levels may be determined by a communication protocol used by the pressure sensor arrangement 36.

For the sake of argument, it is assumed that the same sequence of measured values of pressure levels appears at the first and second milking points 10', 10" in the example of FIGS. 4a and 4b.

However, the sequences of measured values of pressure levels at the at the first and second milking points 10', 10" may differ from each other. Specifically, measured values of pressure levels related to pressure changes caused by slugs in the respective milk conduits 9 of the first and second milking points 10', 10" may be out of sync with each other. Still, the cleaning operation may be performed to hygienic specifications. This may for instance be assessed by the reached pressure levels and other characteristics of measured values of pressure levels at the relevant milking point 10', 10".

The Slug in the common milk line 4 on the other hand, should be maintained throughout the common milk line 4 and not decrease in length to below a minimum length. Accordingly, measured values of pressure levels from the respective milking points 10', 10", 10''' related to slugs in the common milk line 4 should not differ below certain minimum threshold values. Larger differences may lead to the central controller 3 issuing a notification signal.

From the measured values of pressure levels from the pressure sensor arrangement 36, such as the pressure pulse 54 with reduced vacuum pressure levels of longer duration at each milking point 10, a length of a slug may be assessed. The speed of a slug of cleaning liquid along the common milk line 4 has been calculated e.g., with knowledge about a physical distance along the common milk line 4 between connecting positions 14 of two milking points 10 and by assessing the time for a front of a slug to travel between the two milking points 10. The speed of the slug may then be utilised for assessing a length of the slug by measuring the time it takes for the pressure pulse 54 with reduced vacuum pressure levels of longer duration to pass one connecting position 14.

Embodiments of the system 1 are discussed in the following with reference to FIGS. 1-4b.

The central controller 3 being configured to evaluate the series of measured values of pressure levels from at least the first pressure sensor arrangement 36 and the second pressure sensor arrangement 36 may comprise, the central controller 3 being configured:

to compare a first series of measured values of pressure levels from the first pressure sensor arrangement 36 with a second series of measured values of pressure levels from the second pressure sensor arrangement 36.

Thus, for instance properties of a slug at the first and second connecting positions 14 may be reflected by the series of measured values of pressure levels from the first and second pressure sensor arrangements 36 and conclusions may be drawn e.g., such as to its speed and/or as to possible changes of the slug between the respective connecting positions 14, such as increase or decrease in length and its possible dispersion.

The central controller 3 being configured to compare the first series of measured values of pressure levels from the first pressure sensor arrangement 36 with the second series of measured values of pressure levels from the second pressure sensor arrangement 36 may comprise, the central controller 3 being configured:

to assess whether the first series of measured values of pressure levels from the first pressure sensor arrangement 36 and the second series of measured values of pressure levels from the second pressure sensor arrangement 36 fulfil a comparison criterion.

Thus, a change in properties of a slug as it travels in the common milk line 4 between the connecting positions 14 of the first and second milking points 10', 10" may be assessed with respect to at least one comparison criterion.

The comparison criterion may e.g., form a threshold for determining whether a slug has changed within permissible limits or not, such as whether a decrease in length of the slug suggests a fault in the milking installation. A change in the length of the slug may be assessed by measuring a length of the slug in a manner as discussed at each of the connecting positions 14 of the first and second milking points 10', 10" and comparing the measured length.

The central controller 3 being configured to evaluate the series of measured values of pressure levels from at least the first pressure sensor arrangement 36 and the second pressure sensor arrangement 36 may comprise, the central controller 3 being configured:

to compare a first series of measured values of pressure levels from the first pressure sensor arrangement 36 and/or a second series of measured values of pressure levels from the second pressure sensor arrangement 36 with one or more stored series of values of pressure levels.

Thus, for instance properties of a slug at the first and second connecting positions 14 may be compared with stored series of values of pressure levels representing a reference series of values of pressure levels. Conclusions may be drawn in respect of properties of a current series of measured values of pressure levels from the first and/or second pressure sensor arrangement 36. Such as whether the current slug has a sufficient length to ensure proper cleaning of the common milk line 4.

The central controller 3 being configured to compare the first series of measured values of pressure levels from the first pressure sensor arrangement 36 and/or the second series of measured values of pressure levels from the second pressure sensor arrangement 36 with one or more stored series of values of pressure levels may comprise, the central controller 3 being configured:

to assess whether the first series of measured values of pressure levels from the first pressure sensor arrangement 36 and/or the second series of measured values of pressure levels from the second pressure sensor arrangement 36 fulfils a comparison criterion when compared to the one or more stored series of values of pressure levels.

Thus, the properties of a slug in the common milk line 4 may be assessed with respect to at least one predetermined criterion. The comparison criterion may e.g., form a threshold for determining whether a slug has properties within permissible limits or not, such as whether a length of the slug is sufficient to ensure proper cleaning of the common milk line 4.

The one or more stored series of values of pressure levels may be one or more previously obtained series of measured values of pressure levels measured by the first pressure sensor arrangement 36 and/or the second pressure sensor arrangement 36.

The one or more previously obtained series of measured values of pressure levels, may represent a slug that fulfils certain criteria and may be used for comparison of current series of measured values of pressure levels from the first and/or second pressure sensor arrangement/s 36.

The one or more stored series of values of pressure levels may be one or more generalised series of values of pressure levels.

The one or more generalised series of values of pressure levels, which for instance represent a slug that fulfils certain criteria, may be used for comparison of current series of measured values of pressure levels from the first and/or second pressure sensor arrangement/s 36.

The generalised series of values of pressure levels may be a series of values that is based on knowledge about the relevant milking installation 2. Alternatively, or additionally, the generalised series of values of pressure levels may have been established in the milking installation 2 during controlled and/or verified cleaning conditions in the milking installation 2. Each pressure level of the one or more generalised series of values of pressure levels may contain an average of several pressure levels, such as several measured pressure levels.

The one or more generalised series of values of pressure levels may be stored in a look-up table. The one or more generalised series of values of pressure levels may have been established by machine learning during controlled operating conditions in a milking installation and with one or more different cleaning liquids.

According to embodiments, if the comparison criterion is not fulfilled, the notification signal may include an alert signal. In this manner, an alert such as an alarm may be provided if thus, established inferior cleaning of the milking installation 2 or fault in the installation 2 during a cleaning procedure has been assessed.

The alert signal may be provided to an operator at the farm where the installation 2 is located e.g., via the computer or server 46 at the farm.

Figure 5:
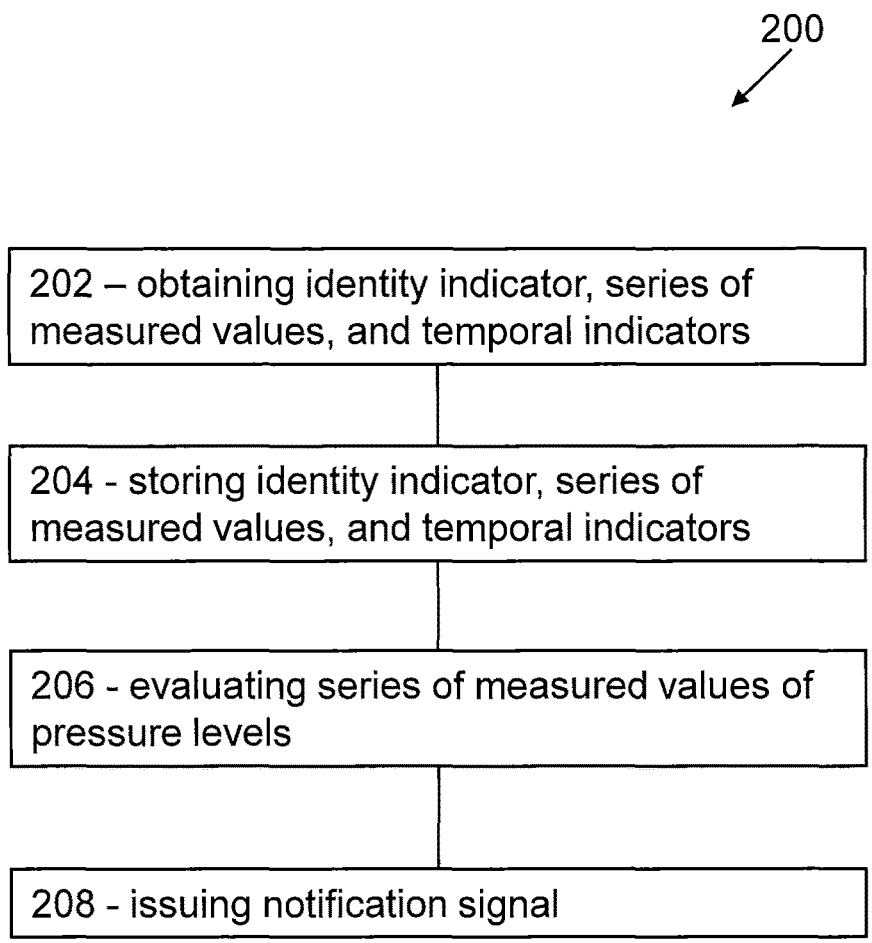
FIG. 5 illustrates embodiments of a method of monitoring a cleaning process in a milking installation.

FIG. 5 illustrates embodiments of a method 200 of monitoring a cleaning process in a milking installation. The milking installation may be a milking installation 2 as discussed above in connection with FIGS. 1-4b. The method 200 may be performed in a system 1 as discussed above with reference to FIGS. 1-4b. Accordingly, in the following reference is also made to FIGS. 1-4b.

Consequently, the milking installation 2 comprises: a common milk line 4, a vacuum source 12, a receiver 6 connected to the common milk line 4 and connected to the vacuum source 12, an air injector 8 connected to the common milk line 4, a number, n, of milking points 10 configured for milking animal individuals and each milking point 10 of the number, n, of milking points 10 being connected to the common milk line 4 at a discrete connecting position 14, a cleaning system 22 configured to utilise a cleaning liquid and being connected to the number, n, of milking points 10 and to the common milk line 4. Each milking point 10 of the number, n, of milking points 10 comprises a pressure sensor arrangement 36 configured to measure values of pressure levels, which pressure levels are indicative of pressure levels at least within a portion of the milking point 10 and at the connecting position 14 of the milking point 10.

The method 200 comprises steps of:
- obtaining 202 from the pressure sensor arrangement 36 at each milking point 10 an identity indicator indicative of the respective pressure sensor arrangement 36, a series of measured values of pressure levels, and temporal indicators designating points in time when each measured value of the series of measured values of pressure levels was measured,
- for each pressure sensor arrangement 36, storing 204 in a database the identity indicator, the series of measured values of pressure levels, and the temporal indicator of each measured value of the series of measured values of pressure levels,
- evaluating 206 the series of measured values of pressure levels from at least a first pressure sensor arrangement 36 of a first milking point 10 of the number, n, of milking points and a second pressure sensor arrangement 36 of a second milking point 10 of the number, n, of milking points 10 in order to determine a progress of a slug of cleaning liquid along the common milk line 4 at the respective connecting positions 14 of the first and second milking points 10, and
- issuing 208 a notification signal related to the progress of the slug of cleaning liquid along the common milk line 4.

Moreover, the method 200 may be adapted to perform any of aspects and/or embodiments of the system 1 and the configurations of its central controller 3 discussed herein, see e.g. above with reference to FIGS. 1-4b.

According to a further aspect, there is provided a computer program comprising computer readable code configured to cause a central controller 3 to perform a method 200 of monitoring a cleaning process in a milking installation according to any one of aspects and/or embodiments discussed herein.

One skilled in the art will appreciate that the method 200 of monitoring a cleaning process in a milking installation may be implemented by programmed instructions. These programmed instructions are typically constituted by a computer program, which, when it is executed in a computer or central controller 3 of the system 1 discussed above, ensures that the computer or central controller 3 carries out the desired monitoring, such as the method steps 202-208 according to the invention. The computer program is usually part of a computer-readable storage medium which comprises a suitable digital storage medium on which the computer program is stored.

Figure 6:
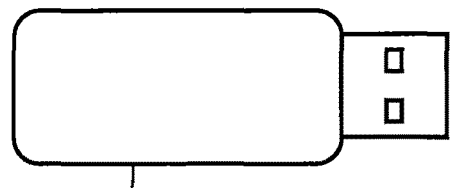
FIG. 6 illustrates embodiments of a computer-readable storage medium.

FIG. 6 illustrates embodiments of a computer-readable storage medium 99 for performing a method 200 of monitoring a cleaning process in a milking installation 2, wherein the computer-readable storage medium 99 comprises computer readable code configured to cause a central controller 3 to perform a method 200 according to any one of aspects and/or embodiments discussed herein.

The computer-readable storage medium 99 may be provided for instance in the form of a data carrier carrying computer program code for performing at least some of the steps 202-208 according to some embodiments when being loaded into the one or more calculation units 62 of a central controller 3 of a system 1 as discussed herein. The data carrier may be, e.g. a ROM (read-only memory), a PROM (programable read-only memory), an EPROM (erasable PROM), a flash memory, an EEPROM (electrically erasable PROM), a hard disc, a CD ROM disc, a memory stick, an optical storage device, a magnetic storage device or any other appropriate medium such as a disk or tape that may hold machine readable data in a non-transitory manner. The computer-readable storage medium may furthermore be provided as computer program code on a server and may be downloaded to the calculation unit 62 remotely, e.g., over an Internet or an intranet connection, or via other wired or wireless communication systems.

The computer-readable storage medium 99 shown in FIG. 6 is a nonlimiting example in the form of a USB memory stick.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the invention, as defined by the appended claims.

The invention claimed is:

1. A system (1) for monitoring a cleaning process in a milking installation (2), the system (1) comprising: a central controller (3) and a database (5), wherein the milking installation (2) comprises:
- a common milk line (4),
- a vacuum source (12),
- a receiver (6) connected to the common milk line (4) and connected to the vacuum source (12),
- an air injector (8) connected to the common milk line (4),
- a number, n, of milking points (10) configured for milking animal individuals and each said milking point (10) of the number, n, of milking points (10) being connected to the common milk line (4) at a connecting position (14),
- a cleaning system (22) configured to utilize a cleaning liquid and being connected to the number, n, of milking points (10) and to the common milk line (4),
- wherein each said milking point (10) of the number, n, of milking points (10) comprises an associated pressure sensor arrangement (36) configured to measure values of pressure levels, which pressure levels are indicative of pressure levels at least within a portion of the associated milking point (10) and at the connecting position (14) of the associated milking point (10), each of the pressure sensor arrangements being configured to generate measurement data comprising:
  - an identity indicator defining the milking point with which the pressure sensor arrangement is associated,
  - measured values of the pressure levels obtained by the pressure sensor arrangement, and
  - for each of the measured values of pressure levels, a temporal indicator defining a point in time when the value of pressure level was measured,
- wherein the central controller (3) is configured to receive the measurement data from the pressure sensor arrangement (36) at each said milking point (10), and
- wherein the central controller (3) is further configured:
  - for each said pressure sensor arrangement (36) to store in the database (5) the identity indicator, the series of the measured values of pressure levels, and the temporal indicator of each said measured value of the series of measured values of pressure levels,
  - to evaluate the series of measured values of pressure levels from at least a first said pressure sensor arrangement (36) of a first said milking point (10) of the number, n, of milking points (10) and a second said pressure sensor arrangement (36) of a second said milking point (10) of the number, n, of milking points (10) in order to determine a progress of a slug of the cleaning liquid along the common milk line (4) at the respective connecting positions (14) of the first and second milking points (10), and
to issue a notification signal related to the progress of the slug of the cleaning liquid along the common milk line (4).

2. The system (1) according to claim 1, wherein the evaluating the series of measured values of pressure levels from at least the first pressure sensor arrangement (36) and the second pressure sensor arrangement (36) performed by the central controller (3) comprises:
comparing the first series of measured values of pressure levels from the first pressure sensor arrangement (36) with the second series of measured values of pressure levels from the second pressure sensor arrangement (36).

3. The system (1) according to claim 2, wherein the comparing the first series of measured values of pressure levels from the first pressure sensor arrangement (36) with the second series of measured values of pressure levels from the second pressure sensor arrangement (36) performed by central controller (3) comprises:
assessing whether the first series of measured values of pressure levels from the first pressure sensor arrangement (36) and the second series of measured values of pressure levels from the second pressure sensor arrangement (36) fulfill a comparison criterion.

4. The system (1) according to claim 3, wherein if the comparison criterion is not fulfilled, the notification signal includes an alert signal.

5. The system (1) according to claim 1, wherein the evaluating the series of measured values of pressure levels from at least the first pressure sensor arrangement (36) and the second pressure sensor arrangement (36) performed by the central controller (3) comprises:
comparing a first series of measured values of pressure levels from the first pressure sensor arrangement (36) and/or a second series of measured values of pressure levels from the second pressure sensor arrangement (36) with one or more stored series of values of pressure levels.

6. The system (1) according to claim 5, wherein the comparing the first series of measured values of pressure levels from the first pressure sensor arrangement (36) and/or the second series of measured values of pressure levels from the second pressure sensor arrangement (36) with the one or more stored series of values of pressure levels comprises performed by the central controller (3) comprises:
assessing whether the first series of measured values of pressure levels from the first pressure sensor arrangement (36) and/or the second series of measured values of pressure levels from the second pressure sensor arrangement (36) fulfills a comparison criterion when compared to the one or more stored series of values of pressure levels.

7. The system (1) according to claim 6, wherein the one or more stored series of values of pressure levels is/are one or more previously obtained series of measured values of pressure levels measured by the first pressure sensor arrangement (36) and/or the second pressure sensor arrangement (36).

8. The system (1) according to claim 6, wherein the one or more stored series of values of pressure levels is/are one or more generalized series of values of pressure levels.

9. The system (1) according to claim 1, wherein each said pressure sensor arrangement (36) comprises:
a pressure sensor (38),
a control unit (40),
a memory unit (42) configured to store at least one series of measured values of pressure levels, and
a communication interface (44) configured to communicate directly or indirectly with the central controller (3).

10. The system (1) according to claim 9, wherein the communication interface (44) is configured to wirelessly communicate with the central controller (3), wherein the central controller (3) obtains the identity indicator, the series of measured values of pressure levels, and the temporal indicators.

11. The system (1) according to claim 1, wherein the central controller (3) comprises stored physical data related to the milking installation (2), the physical data comprising one or more of:
distances between adjacent said connecting positions (14) along the common milk line (4), a maximum vacuum pressure level in the receiver (6), and
patterns of pressure level changes during cleaning of the milking installation (2).

12. The system (1) according to claim 1, wherein the central controller (3) is arranged at a service provider remote from the milking installation (2).

13. The system (1) according to claim 1, wherein in the number, n, of milking points (10), n≥2 milking points (10).

14. The system (1) according to claim 1, wherein in the number, n, of milking points (10), n≥10 milking points (10).

15. The system of claim 1, wherein the central controller is configured to determine an existence and location of a system error causing the slug of the cleaning liquid to disperse by comparing the measurement data from the pressure sensor arrangements of the milking points located at different positions along the common milk line.

16. The system of claim 1, wherein the system is free of any pressure sensor along the common milk line other than the pressure sensor arrangement associated with each of the milking points.

17. A method (200) of monitoring a cleaning process in a milking installation (2), wherein
the milking installation (2) comprises:
a common milk line (4),
a vacuum source (12),
a receiver (6) connected to the common milk line (4) and connected to the vacuum source (12),
an air injector (8) connected to the common milk line (4),
a number, n, of milking points (10) configured for milking animal individuals and each milking point (10) of the number, n, of milking points (10) being connected to the common milk line (4) at a discrete connecting position,
a cleaning system (22) configured to utilise a cleaning liquid and being connected to the number, n, of milking points (10) and to the common milk line (4), wherein
each milking point (10) of the number, n, of milking points (10) comprises an associated pressure sensor arrangement (36) configured to measure values of pressure levels, which pressure levels are indicative of pressure levels at least within a portion of the associated milking point (10) and at the connecting position of the milking point (10), wherein
the method (200) comprises steps of:
obtaining (202) from the pressure sensor arrangement (36) at each milking point (10) an identity indicator indicative of the respective pressure sensor arrangement (36), a series of measured values of pressure levels, and temporal indicators designating points in time when each measured value of the series of measured values of pressure levels was measured, for each said pressure sensor arrangement (36), storing (204) in a database (5) the identity indicator, the series of measured values of pressure levels, and the temporal indicator of each measured value of the series of measured values of pressure levels, evaluating (206) the series of measured values of pressure levels from at least a first pressure sensor arrangement (36) of a first said milking point (10) of the number, n, of milking points (10) and a second pressure sensor arrangement (36) of a second said milking point (10) of the number, n, of milking points (10) in order to determine a progress of a slug of cleaning liquid along the common milk line (4) at the respective connecting positions (14) of the first and second milking points (10), and issuing (208) a notification signal related to the progress of the slug of cleaning liquid along the common milk line (4).

18. A computer-readable storage medium (99) for performing a method (200) of monitoring a cleaning process in a milking installation (2), wherein the computer-readable storage medium (99) comprises computer readable code configured to cause a central controller (3) to perform the method (200) according to claim 17.

19. The method of claim 17, further comprising determining an existence and location of a system error causing the slug of the cleaning liquid to disperse by comparing the measurement data from the pressure sensor arrangements of the milking points located at different positions along the common milk line.

20. The method of claim 17, wherein the milking installation is free of any pressure sensor along the common milk line other than the pressure sensor arrangement associated with each of the milking points.

\* \* \* \* \*